US009463454B2

(12) United States Patent
Wendland

(10) Patent No.: US 9,463,454 B2
(45) Date of Patent: Oct. 11, 2016

(54) AMINO-CONTAINING POLYMERIC MATERIAL WITH RIGID AND CONTORTED DIVINYL CROSSLINKER

(71) Applicant: 3M INNOVATIVE PROPERTIES COMPANY, St. Paul, MN (US)

(72) Inventor: Michael S. Wendland, North St. Paul, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/889,666

(22) PCT Filed: Apr. 22, 2014

(86) PCT No.: PCT/US2014/034944
§ 371 (c)(1),
(2) Date: Nov. 6, 2015

(87) PCT Pub. No.: WO2014/186095
PCT Pub. Date: Nov. 20, 2014

(65) Prior Publication Data
US 2016/0121321 A1 May 5, 2016

Related U.S. Application Data

(60) Provisional application No. 61/823,161, filed on May 14, 2013.

(51) Int. Cl.
*B01J 41/14* (2006.01)
*B01J 41/20* (2006.01)
*C08F 212/34* (2006.01)

(52) U.S. Cl.
CPC ............... *B01J 41/14* (2013.01); *B01J 41/20* (2013.01)

(58) Field of Classification Search
CPC ................................ B01J 41/14; B01J 41/20
USPC .......................................................... 521/32
See application file for complete search history.

(56) References Cited

U.S. PATENT DOCUMENTS

| 7,690,514 B2 | 4/2010 | McKeown |
| 9,139,674 B2 | 9/2015 | Wendland |
| 9,296,668 B2 | 3/2016 | Wendland |

FOREIGN PATENT DOCUMENTS

| DE | 3434286 | 5/1985 | |
| DE | 3434286 A1 * | 5/1985 | ........... C08G 63/193 |
| JP | 2000-119420 | 4/2000 | |
| JP | 2000119420 A * | 4/2000 | |
| WO | WO 2005/012397 | 2/2005 | |
| WO | WO 2014/186094 | 11/2014 | |
| WO | WO 2014/186108 | 11/2014 | |

OTHER PUBLICATIONS

Budd, "Polymers of intrinsic microporosity (PIMs): robust, solution-processable, organic nonporous materials", Chemical Communications, 2004, pp. 230-231.
Carta, "Novel Spirobisindanes for Use as Precursors to Polymers of Intrinsic Microporosity", Organic Letters, 2008, vol. 10, No. 13, pp. 2641-2643.
Ezzeldin, "Synthesis and Properties of Anion Exchangers Derived from Chloromethyl Styrene Codivinylbenzene and Their Use in Water Treatment", International Journal of Polymer Science, 2010, vol. 2010, 9 pages.
Liu, "Efficient and stable solid acid catalysts synthesized from sulfonation of swelling mesoporous polydivinylbenzenes", Journal of Catalysis, 2010, vol. 271, pp. 52-58, XP26980665.
Pepper, "Sulphonated Cross-Linked Polystyrene: A Monofunctional Cation-Exchange Resin", Journal of Applied Chemistry, 1951, vol. 1, No. 3, pp. 124-132.
International Search Report for PCT International Application No. PCT/US2014/034944, mailed on Aug. 25, 2014, 3 pages.

* cited by examiner

*Primary Examiner* — Michael M Bernshteyn
(74) *Attorney, Agent, or Firm* — Jean A. Lown

(57) ABSTRACT

Amino-containing polymeric materials and methods of making these materials are provided. More specifically, the amino-containing polymeric materials are prepared by treating a precursor polymeric material with an amine compound. The precursor polymeric materials are formed from a polymerizable composition that contains a rigid and contorted divinyl crosslinker. The amino-containing polymeric materials can be used as anion exchange resins.

13 Claims, No Drawings

AMINO-CONTAINING POLYMERIC MATERIAL WITH RIGID AND CONTORTED DIVINYL CROSSLINKER

CROSS REFERENCE TO RELATED APPLICATIONS

This application is a national stage filing under 35 U.S.C. 371 of PCT/US2014/034944, filed Apr. 22, 2014, which claims priority to U.S. Provisional Application No. 61/823,161, filed May 14, 2013, the disclosure of which is incorporated by reference in its/their entirety herein.

TECHNICAL FIELD

Amino-containing polymeric materials are prepared using free-radically polymerizable spirobisindane monomers as crosslinkers. The resulting amino-containing polymeric materials and methods of making the amino-containing polymeric materials are described.

BACKGROUND

Ion exchange resins used in high pressure chromatography columns are desired that can withstand the relatively high pressures and/or high temperatures typically encountered. Higher pressures can often impart greater separation power. Such ion exchange resins are usually crosslinked to provide resilience to deformation or fracture under high pressure and/or high temperature conditions. For example, many commercially available ion exchange resins for high pressure separations are based on divinylbenzene cross-linked polystyrene that are functionalized to provide ionic groups. Such materials are described, for example, in Ezzeldin et al., *International Journal of Polymer Science*, 2010, Article ID 684051.

Polymeric materials have been prepared using spirobisindane-containing materials. For example, Reaction Scheme A shows the reaction of 5,5',6,6'-tetrahydroxy-3,3,3',3'-tetramethyl-1,1'-spirobisindane with 2,3,5,6-tetrafluoroterephthalonitrile to form a polymeric material with fused dioxin rings as linking groups. These polymers and their synthesis methods are described more fully, for example, in Budd et al., *Chem. Commun.*, 2004, 230 and in U.S. Pat. No. 7,690,514 (McKeown et al.).

Reaction Scheme A

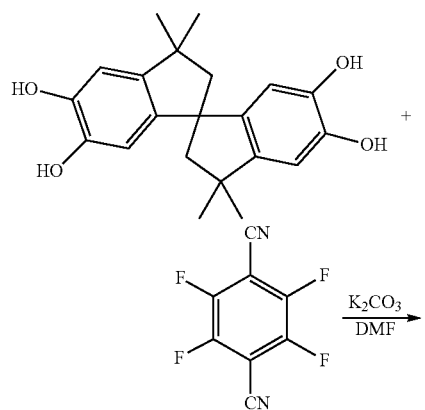

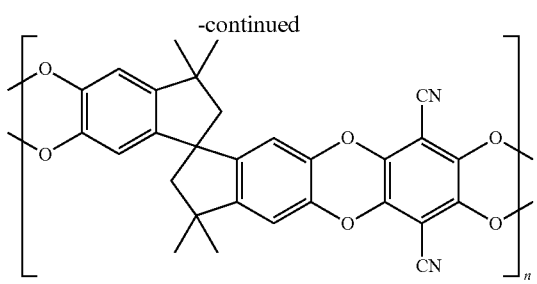

The polymerization times tend to be lengthy (e.g., several days) and the monomers used to form the polymers are often quite expensive.

SUMMARY

Amino-containing polymeric materials and methods of making these materials are provided. More specifically, the amino-containing polymeric materials are prepared by treating a precursor polymeric material with an amine compound. The precursor polymeric materials are formed from a polymerizable composition that contains a rigid and contorted divinyl crosslinker. The amino-containing polymeric materials can be used as anion exchange resins. These anion exchange resins can have higher glass transition temperatures, and/or greater resistance to compression, and/or improved thermal stability than comparable polymeric materials prepared using common crosslinkers such as divinylbenzene.

In a first aspect, an amino-containing polymeric material is provided that includes a reaction product of a reaction mixture containing a) a precursor polymeric material and b) an amine compound. The precursor material includes the polymerized product of a polymerizable composition containing i) a monomer mixture and ii) a free radical initiator. The monomer mixture contains 1) a first monomer of Formula (I)

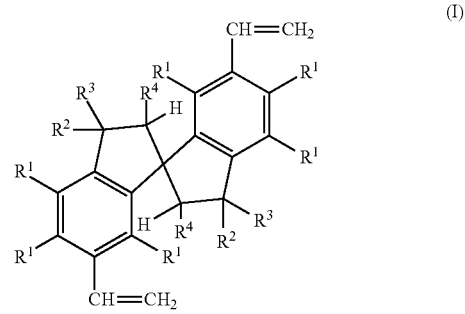

and 2) a second monomer of Formula (II).

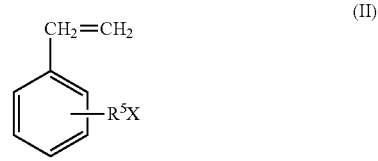

In the monomer of Formula (I), each $R^1$ is hydrogen, halo, alkyl, aryl, alkaryl, or aralkyl, wherein at least one $R^1$ is hydrogen. Each $R^2$ is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings. Each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon bond. Each $R^4$ is independently hydrogen or combines with $R^3$ connected to the adjacent carbon atom to form a carbon-carbon bond. In the monomer of Formula (II), the group $R^5$ is an alkylene and the group X is halo.

In a second aspect, a method of making an amino-containing polymeric material is provided. The method includes preparing a polymerizable composition containing a) a monomer mixture and b) a free radical initiator. The monomer mixture contains i) a first monomer of Formula (I) and ii) a second monomer of Formula (II). The first monomer of Formula (I) and the second monomer of Formula (II) are the same as described above. The method further includes forming a precursor polymeric material by reacting the polymerizable composition and then treating the precursor polymeric material with an amine compound to form the amino-containing polymeric material.

DETAILED DESCRIPTION

Amino-containing polymeric materials are prepared by treating a precursor polymeric material with an amine compound. The precursor polymeric materials are formed from a polymerizable composition that contains a crosslinker that is a free-radically polymerizable spirobisindane monomer. The amino-containing polymeric material can be used, for example, as an anion exchange resin.

The terms "a", "an", and "the" are used interchangeably with "at least one" to mean one or more of the elements being described.

The term "halo" refers to a monovalent group that is a radical of a halogen atom. The halo can be fluoro, chloro, bromo, or iodo.

The term "alkyl" refers to a monovalent group that is a radical of an alkane. The alkyl group can have 1 to 20 carbon atoms and can be linear, branched, cyclic, or a combination thereof. When the alkyl is linear, it can have 1 to 20 carbon atoms. When the alkyl is branched or cyclic, it can have 3 to 20 carbon atoms.

The term "alkoxy" refers to a monovalent group of formula —OR where R is an alkyl as defined above.

The term "aryl" refers to a monovalent group that is a radical of an aromatic carbocyclic compound. The aryl group has at least one aromatic carbocyclic ring and can have 1 to 5 optional rings that are connected to or fused to the aromatic carbocyclic ring. The additional rings can be aromatic, aliphatic, or a combination thereof. The aryl group usually has 5 to 20 carbon atoms.

The term "alkaryl" refers to an aryl group substituted with at least one alkyl group. The alkaryl group contains 6 to 40 carbon atoms. The alkaryl group often contains an aryl group having 5 to 20 carbon atoms and an alkyl group having 1 to 20 carbon atoms.

The term "aralkyl" refers to an alkyl group substituted with at least one aryl group. The aralkyl group contains 6 to 40 carbon atoms. The aralkyl group often contains an alkyl group having 1 to 20 carbon atoms and an aryl group having 5 to 20 carbon atoms.

The term "carbocyclic group" refers to an aliphatic or aromatic carbon ring structure. The carbocyclic group can be saturated, partially unsaturated, or unsaturated. The carbocyclic group often contains 5 to 20 carbon atoms.

The term "polymer" refers to both polymeric materials prepared from one monomer such as a homopolymer or to polymeric materials prepared from two or more monomers such as a copolymer, terpolymer, or the like. Likewise, the term "polymerize" refers to the process of making a polymeric material that can be a homopolymer, copolymer, terpolymer, or the like.

In a first aspect, an amino-containing polymeric material is provided that includes a reaction product of a reaction mixture containing a) a precursor polymeric material and b) an amine compound. The precursor material includes the polymerized product of a polymerizable composition that contains a monomer mixture and a free radical initiator. The monomer mixture contains a first monomer that is a spirobisindane monomer having two free radically polymerizable groups and a second monomer that is styrene substituted with a haloalkyl group.

The spriobisindane monomer having two free radically polymerizable groups is a crosslinker of Formula (I). The two free radically polymerizable groups are vinyl groups.

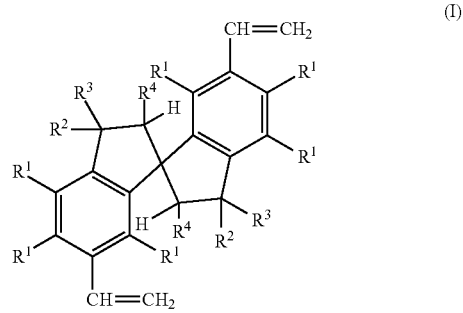

(I)

In the first monomer of Formula (I), each $R^1$ is hydrogen, halo, alkyl, aryl, alkaryl, or aralkyl, wherein at least one $R^1$ is hydrogen. Each $R^2$ is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings. Each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon bond. Each $R^4$ is independently hydrogen or combines with $R^3$ connected to the adjacent carbon atom to form a carbon-carbon bond.

Each $R^1$ in Formula (I) is hydrogen, halo, alkyl, aryl, alkaryl, or aralkyl. Suitable halo groups for $R^1$ include, but are not limited to, chloro and bromo. Suitable alkyl groups often have up to 20 carbon atoms, up to 10 carbon atoms, up to 6 carbon atoms, or up to 4 carbon atoms. For example, the alkyl groups can have 1 to 10 carbon atoms, 3 to 10 carbon atoms, 1 to 6 carbon atoms, 3 to 6 carbon atoms, or 1 to 4 carbon atoms. Suitable aryl groups often have up to 12 carbon atoms, up to 10 carbon atoms, or up to 6 carbon atoms. In many embodiments, the aryl group is phenyl. Suitable alkaryl and aralkyl groups often have an aryl group with up to 12 carbon atoms, up to 10 carbon atoms, or up to 6 carbon atoms and an alkyl group with up to 10 carbon atoms, up to 6 carbon atoms, or up to 4 carbon atoms. An example alkaryl group is phenyl substituted with one or more alkyl groups having 1 to 10 carbon atoms, 1 to 6 carbon atoms, or 1 to 4 carbon atoms. An example aralkyl group is an alkyl group having 1 to 10 carbon atoms, 1 to 6 carbon atoms, or 1 to 4 carbon atoms substituted with a phenyl.

Each $R^2$ in Formula (I) is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings. Suitable alkyl groups often have up to 20 carbon atoms, up to 10 carbon atoms, up to 6 carbon atoms, or up to 4 carbon atoms. For example, the alkyl groups can have 1 to 10 carbon atoms, 3 to 10 carbon atoms, 1 to 6 carbon atoms, 3 to 6 carbon atoms, or 1 to 4 carbon atoms. Suitable aryl groups often have up to 12 carbon atoms, up to 10 carbon atoms, or up to 6 carbon atoms. In many embodiments, the aryl group is phenyl. Suitable alkaryl and aralkyl groups often have an aryl group with up to 12 carbon atoms, up to 10 carbon atoms, or up to 6 carbon atoms and an alkyl group with up to 10 carbon atoms, up to 6 carbon atoms, or up to 4 carbon atoms. An example alkaryl group is phenyl substituted with one or more alkyl groups having 1 to 10 carbon atoms, 1 to 6 carbon atoms, or 1 to 4 carbon atoms. An example aralkyl group is an alkyl group having 1 to 10 carbon atoms, 1 to 6 carbon atoms, or 1 to 4 carbon atoms substituted with a phenyl.

Suitable cyclic alkyl groups that form through the combination of $R^2$ and $R^3$ can have up to 10 carbon atoms, up to 8 carbon atoms, or up to 6 carbon atoms. In many embodiments, the cyclic alkyl group has 3 to 8 carbon atoms or 3 to 6 carbon atoms. The cyclic alkyl group can optionally be fused to one or more carbocyclic rings. Each carbocyclic ring typically has up to 10 carbon atoms, up to 8 carbon atoms, or up to 6 carbon atoms and can be aromatic (i.e., unsaturated), partially unsaturated, or saturated. The fused carbocyclic rings are often benzene rings. An example cyclic alkyl with one or more fused carbocyclic rings is fluorenyl (i.e., a monovalent radical of fluorene).

Each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon bond. Suitable alkyl groups often have up to 20 carbon atoms, up to 10 carbon atoms, up to 6 carbon atoms, or up to 4 carbon atoms. For example, the alkyl groups can have 1 to 10 carbon atoms, 3 to 10 carbon atoms, 1 to 6 carbon atoms, 3 to 6 carbon atoms, or 1 to 4 carbon atoms. Suitable aryl groups often have up to 12 carbon atoms, up to 10 carbon atoms, or up to 6 carbon atoms. In many embodiments, the aryl group is phenyl. Suitable alkaryl and aralkyl groups often have an aryl group with up to 12 carbon atoms, up to 10 carbon atoms, or up to 6 carbon atoms and an alkyl group with up to 10 carbon atoms, up to 6 carbon atoms, or up to 4 carbon atoms. An example alkaryl group is phenyl substituted with one or more alkyl groups having 1 to 10 carbon atoms, 1 to 6 carbon atoms, or 1 to 4 carbon atoms. An example aralkyl group is an alkyl group having 1 to 10 carbon atoms, 1 to 6 carbon atoms, or 1 to 4 carbon atoms substituted with a phenyl. Suitable cyclic alkyl groups that form through the combination of $R^2$ and $R^3$ can have up to 10 carbon atoms, up to 8 carbon atoms, or up to 6 carbon atoms. In many embodiments, the cyclic alkyl group has 3 to 8 carbon atoms or 3 to 6 carbon atoms. The cyclic alkyl group can optionally be fused to one or more carbocyclic rings. Each carbocyclic ring typically has up to 10 carbon atoms, up to 8 carbon atoms, or up to 6 carbon atoms and can be aromatic (i.e., unsaturated), partially unsaturated, or saturated. The fused carbocyclic rings are often benzene rings. An example cyclic alkyl with one or more fused carbocyclic rings is fluorenyl (i.e., a monovalent radical of fluorene).

Each $R^4$ is independently hydrogen or combines with $R^3$ connected to an adjacent carbon atom to form a carbon-carbon bond.

In some specific embodiments of the monomer of Formula (I), $R^1$ is hydrogen or halo, $R^2$ is an alkyl having 1 to 10 carbon atoms (e.g., 1 to 6 carbon atoms, 1 to 4 carbon atoms, 1 to 3 carbon atoms, or 1 carbon atom), $R^3$ is an alkyl having 1 to 10 carbon atoms (e.g., 1 to 6 carbon atoms, 1 to 4 carbon atoms, 1 to 3 carbon atoms, or 1 carbon atom), and $R^4$ is hydrogen. In other more specific embodiments of the monomer of Formula (I), each $R^1$ is hydrogen, $R^2$ is an alkyl having 1 to 6 carbon atoms (e.g., 1 to 4 carbon atoms, 1 to 3 carbon atoms, or 1 carbon atom), $R^3$ is an alkyl having 1 to 6 carbon atoms (e.g., 1 to 4 carbon atoms, 1 to 3 carbon atoms, or 1 carbon atom), and $R^4$ is hydrogen. In an even more specific embodiment of the monomer of Formula (I), each $R^1$ is hydrogen, $R^2$ is methyl, $R^3$ is methyl, and $R^4$ is hydrogen; this monomer is 3,3,3',3'-tetramethyl-1,1'-spirobisindan-6,6'-divinyl.

The monomers of Formula (I) can be prepared using any known method. For example, monomers can be prepared as shown in Reaction Scheme B where $R^1$ and $R^4$ are hydrogen and where $R^2$ and $R^3$ are alkyl or hydrogen.

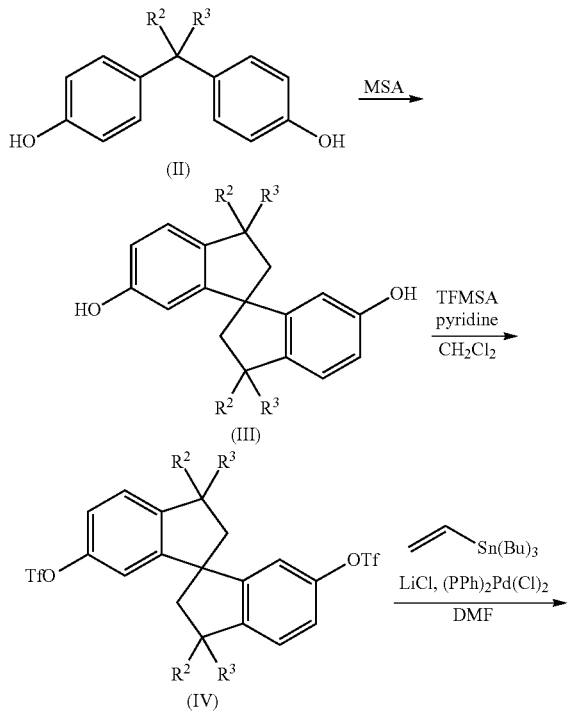

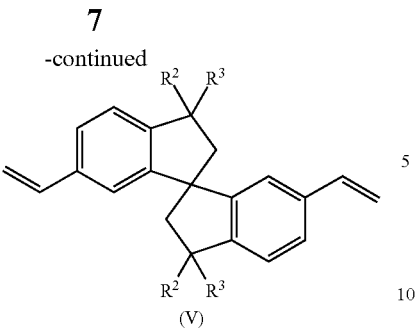

(V)

A bisphenol compound of Formula (II) is reacted with methane sulfonic acid (MSA) to produce the spirobisindan-6,6'-diol compound of Formula (III). The spirobisindan-6,6'-diol can be reacted with trifluoromethane sulfonic anhydride (TFMSA) in the presence of pyridine and a solvent such as methylene chloride to produce the spirobisindan-6,6'-bistriflate compound of Formula (IV). The spirobisindan-6,6'-bistriflate compound can subsequently be subjected to a Stille coupling reaction to produce the spirobisindane-6,6'-divinyl compound of Formula (V). That is, the compound of Formula (IV) can be reacted with tributyl(vinyl) tin in the presence of lithium chloride, a palladium catalyst, and a solvent such as dimethyl formamide (DMF) to introduce polymerizable groups. The details for this synthesis approach are further described in the Example section for the preparation of the monomer 3,3,3',3'-tetramethyl-1,1'-spirobisindan-6,6'-divinyl starting from bisphenol A as the compound of Formula (II).

Monomers of Formula (I) can be prepared as shown in Reaction Scheme where $R^3$ and $R^4$ combine to form a carbon-carbon double bond and where $R^2$ is an alkyl, aryl, alkaryl, or aralkyl C.

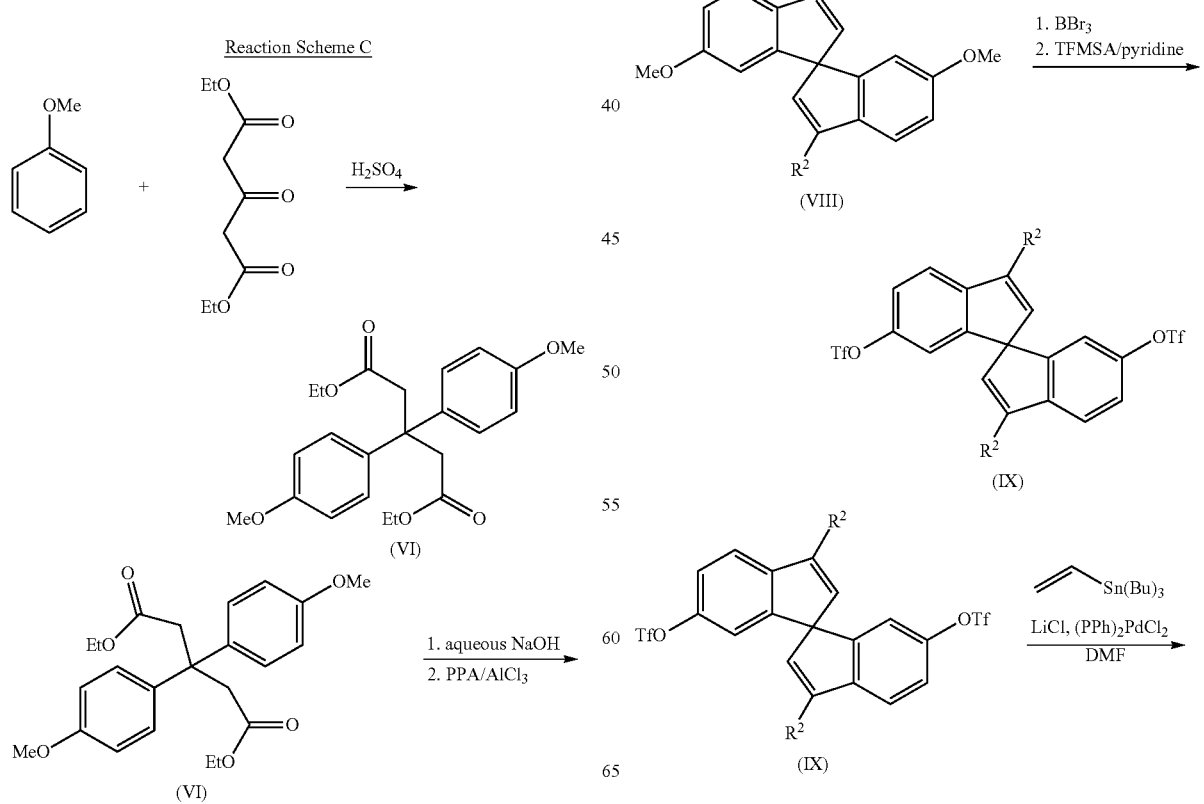

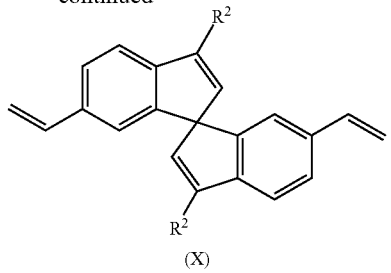

(X)

The chemistry involved in the formation of the dione (Compound (VII)) is described in *Org. Lett.*, 2008, 10, 2641. More specifically, diethyl-1,3-acetonedicarboxylate and methoxybenzene are reacted in the presence of sulfuric acid to form Compound (VI). This reaction is followed by hydrolysis and then Friedel-Crafts acylation mediated by polyphosphoric acid (PPA) and aluminum trichloride (AlCl$_3$) to form Compound (VII). Various monomers of Formula (I) can be prepared from the dione (Compound (VII)) using Grignard reactions. This type of reaction is exemplified in Reaction Scheme C using R$^2$MgBr as the Grignard reagent. The dehydrated spirobisindane (Compound (VIII)) is formed after treatment with aqueous sulfuric acid. Compound (VIII) is reacted with boron tribromide (BBr$_3$) to convert the methoxy groups to hydroxyl groups. The hydroxyl groups are then reacted with trifluoromethane sulfonic anhydride (TFMSA) in the presence of pyridine and a solvent such as methylene chloride to produce Compound (IX) with triflate groups. The triflate groups are reacted with tributyl(vinyl) tin in the presence of lithium chloride, a palladium catalyst, and a solvent such as N,N-dimethyl formamide (DMF). This reaction, which is often referred to as a Stille coupling reaction, introduces the polymerizable groups as shown in Compound (X).

The monomer mixture contains up to 25 mole percent of the crosslinker of Formula (I) based on total moles of the monomer having a single ethylenically unsaturated group. That is, mole percent crosslinker of Formula (I) is is equal to [moles of crosslinker of Formula (I)÷(moles of second monomer of Formula (II)+moles of optional monomers having a single ethylenically unsaturated group)]×100). If more than 25 mole percent of the crosslinker of Formula (I) is used, the resulting polymeric material may be too highly crosslinked for many applications. For example, the resulting polymeric material may be too brittle. In some embodiments, the monomer mixtures contain up to 20 mole percent, up to 15 mole percent, up to 10 mole percent, or up to 5 mole percent of the crosslinker of Formula (I). Often, the polymerizable compositions contain at least 1 mole percent of the crosslinker of Formula (I) based on moles of monomers having a single ethylenically unsaturated group in the monomer mixture. If less than 1 mole percent of the crosslinker of Formula (I) is used, the resulting polymeric material may be too easily deformed for many applications. The monomer mixture often contains at least 2 mole percent, at least 5 mole percent, or at least 10 mole percent of the crosslinker of Formula (I). In some embodiments, the monomer mixture contains an amount of the crosslinker of Formula (I) in a range of 1 to 25 mole percent, in a range of 1 to 20 mole percent, in a range of 1 to 15 mole percent, in a range of 1 to 10 mole percent, in a range of 2 to 25 mole percent, in a range of 2 to 20 mole percent, in a range of 2 to 10 mole percent, in a range of 5 to 25 mole percent, in a range of 5 to 20 mole percent, in a range of 5 to 10 mole percent, in a range of 10 to 25 mole percent, or in a range of 10 to 20 mole percent.

Stated in terms of a total weight of monomers in the monomer mixture, the polymerizable composition often contains up to 60 weight percent of the crosslinker of Formula (I). For example, the polymerizable composition can contain up to 50 weight percent, up to 40 weight percent, up to 30 weight percent, or up to 20 weight percent of the crosslinker of Formula (I). The polymerizable composition typically contains at least 1 weight percent, at least 2 weight percent, at least 5 weight percent, or at least 10 weight percent of the crosslinker of Formula (I).

In addition to the crosslinker of Formula (I), the monomer mixture includes a second monomer of Formula (II).

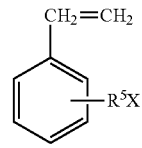

In the second monomer of Formula (II), the group R$^5$ is an alkylene and the group X is halo. Suitable alkylene groups often have 1 to 10 carbon atoms, 1 to 6 carbon atoms, 1 to 4 carbon atoms, or 1 to 3 carbon atoms. The halo group X is often chloro or bromo. The —R$^5$X group is typically positioned in the ortho or para position relative to the vinyl group.

In some exemplary compounds of Formula (II), the group —R$^5$X is methylchloride. That is, some example compounds of Formula (II) are 4-vinylbenzyl chloride and 2-vinylbenzyl chloride.

Some monomer mixtures contain only a first monomer of Formula (I) and a second monomer of Formula (II). These monomer mixtures can contain, for example, 1 to 60 weight percent first monomer of Formula (I) and 40 to 99 weight percent second monomer of Formula (II). For example, the monomer mixtures can contain 2 to 50 weight percent of the first monomer and 50 to 98 weight percent of the second monomer, 5 to 40 weight percent of the first monomer and 60 to 95 weight percent of the second monomer, 10 to 30 weight percent of the first monomer and 70 to 90 weight percent of the second monomer, 10 to 20 weight percent of the first monomer and 80 to 90 weight percent of the second monomer, or 5 to 20 weight percent of the first monomer and 80 to 95 weight percent of the second monomer.

In addition to the first monomer of Formula (I) and the second monomer of Formula (II), the monomer mixture can include optional monomers having a single ethylenically unsaturated group. These optional monomers are often styrene, styrene substituted with one or more alkyl groups, alkyl(meth)acrylate, or a combination thereof. Suitable alkyl groups that can be used as substituents for styrene often have 1 to 20 carbon atoms, 1 to 10 carbon atoms, 1 to 6 carbon atoms, or 1 to 4 carbon atoms. Examples of styrene substituted with alkyl groups include, but are not limited to, ethyl styrene and tert-butyl styrene. Suitable alkyl(meth)acrylates typically have an alkyl group with 1 to 20 carbon atoms, 1 to 10 carbon atoms, 1 to 6 carbon atoms, or 1 to 4 carbon atoms. Example alkyl(meth)acrylates include, but are not limited to, methyl(meth)acrylate, ethyl(meth)acrylate, n-propyl(meth)acrylate, isopropyl(meth)acrylate, n-butyl (meth)acrylate, isobutyl(meth)acrylate, pentyl(meth)acrylate, 2-methylbutyl(meth)acrylate, n-hexyl(meth)acrylate, cyclohexyl(meth)acrylate, 4-methyl-2-pentyl(meth)acrylate, n-heptyl(meth)acrylate, n-octyl(meth)acrylate, isooctyl (meth)acrylate, 2-ethylhexyl(meth)acrylate, isoamyl(meth) acrylate, nonyl(meth)acrylate, isononyl(meth)acrylate, n-decyl(meth)acrylate, isodecyl(meth)acrylate, lauryl(meth) acrylate, isotridecyl(meth)acrylate, stearyl(meth)acrylate, isobornyl(meth)acrylate, and the like. In many embodiments, the alkyl(meth)acrylates are alkyl methacrylates.

If these optional third monomers are used, they typically can replace some of the monomer of Formula (II). Such a replacement can be done, for example, to vary the amount of amino groups that are available in the final amino-containing polymeric material. In some applications, such as where the amino-containing polymeric materials are used as anion exchange resins, it is desirable to maximize the number of amino groups. That is, the amount of the optional third monomer is often minimized. The monomer mixture typically contains no more than 30 weight percent, no more than 20 weight percent, no more than 10 weight percent, no more than 5 weight percent, no more than 2 weight percent, or no more than 1 weight percent of the optional third monomer based on a total weight of monomers in the monomer mixture.

In some embodiments, an additional crosslinker that is not of Formula (I) can be added to the monomer mixture. Suitable additional crosslinkers are those that have a plurality (e.g., 2 to 4) of ethylenically unsaturated groups and that are miscible with the crosslinker of Formula (I) and the second monomer in the monomer mixture. The additional crosslinker is often selected to be hydrophobic. Suitable additional crosslinkers include polyvinyl aromatic monomers or aliphatic (meth)acrylates with multiple (meth)acryloyl groups.

The term "polyvinyl aromatic monomer" refers to a monomer that is not of Formula (I) and that has a plurality (e.g., two or three) of vinyl groups that are each bonded to an aromatic carbocyclic group. The aromatic carbocyclic group has at least one aromatic carbocyclic ring and can have 1 to 5 optional rings that are connected to or fused to the aromatic carbocyclic ring. The additional rings can be aromatic, aliphatic, or a combination thereof. Suitable additional crosslinkers include, but are not limited to divinylbenzene, divinylbenzene substituted with one or more alkyl groups, trivinylbenzene, trivinylbenzenes substituted with one or more alkyl groups.

Suitable additional crosslinkers that are aliphatic (meth) acrylates include those with two to four methacryloyl groups. Example aliphatic (meth)acrylates with two (meth) acryloyl groups include, but are not limited to, various alkylene diol di(meth)acrylates (e.g., 1,6-hexanediol dimethacrylate) and various alkylene glycol di(meth)acrylates (e.g., ethylene glycol di(meth)acrylate, triethylene glycol di(meth)acrylate, and tripropyleneglycol di(meth)acrylate, and polyalkyleneglycol di(meth)acrylate such as that commercially available under the trade designation BISOMER™ EP100DMA from Cognis Co. (Germany)). Example aliphatic (meth)acrylates with three (meth)acryloyl groups include, but are not limited to, trimethylolpropane tri(meth)acrylate, pentaerythritol tri(meth)acrylate, and propoxylated trimethylolpropane tri(meth)acrylate such as the material commercially available under the trade designation CD501 from Sartomer Co. (Exton, Pa.). Example aliphatic (meth)acrylates with four (meth)acryloyl groups include, but are not limited to, di-trimethylolpropane tetra (meth)acrylate and pentaerythritol tetra(meth)acrylate. In many embodiments, the (meth)acryloyl groups are methacryloyl groups.

When an additional crosslinker is used in combination with the crosslinker of Formula (I) in the polymerizable compositions, the total amount of crosslinker can be up to 25 mole percent (based on total moles of monomers having a single ethylenically unsaturated group) but the amount of the crosslinker of Formula (I) is at least 1 mole percent. The mole percent is based on the moles of the second monomer. In some embodiments, the polymerizable composition can contain 1 to 24 mole percent of the crosslinker of Formula (I) and 1 to 24 mole percent of the additional crosslinker. Typically, the crosslinker of Formula (I) is at least 5 percent of the total moles of crosslinker in the polymerizable composition. For example, the crosslinker of Formula (I) is at least 10 percent, at least 20 percent, at least 30 percent, at least 40 percent, at least 50 percent, at least 60 percent, at least 70 percent, at least 80 percent, at least 90 percent, or at least 95 percent of the total moles of crosslinker in the polymerizable composition.

In addition to the various monomers, the polymerizable compositions (i.e., the monomer mixture plus other reactants involved in the polymerization reaction plus any solvent that may be present) typically include an initiator for free radical polymerization reactions. Any suitable free radical initiator can be used. In some embodiments, the free radical initiator is a thermal initiator that can be activated at a temperature above room temperature. In other embodiments, the free radical initiator is a redox initiator. Suitable free radical initiators are typically selected to be miscible with the monomers included in the polymerizable composition. The free radical initiator is typically present in an amount in a range of 0.05 to 10 weight percent, in a range of 0.05 to 5 weight percent, in a range of 0.05 to 2 weight percent, in a range of 0.05 to 1 weight percent, in a range of 0.1 to 5 weight percent, in a range of 0.2 to 5 weight percent, in a range of 0.5 to 5 weight percent, in a range of 0.1 to 2 weight percent, or in a range of 0.1 to 1 weight percent. The weight percent is based on a total weight of monomer in the polymerizable composition. Both the type and amount of initiator can affect the polymerization rate.

Suitable thermal initiators include organic peroxides and azo compounds. Example azo compounds include, but are not limited to, those commercially available under the trade designation VAZO from E.I. du Pont de Nemours Co. (Wilmington, Del.) such as VAZO 64 (2,2'-azobis(isobutyronitrile), which is often referred to as AIBN) and VAZO 52 (2,2'-azobis(2,4-dimethylpentanenitrile)). Other azo compounds are commercially available from Wako Chemicals USA, Inc. (Richmond, Va.) such as V-601 (dimethyl 2,2'-azobis(2-methylproprionate)), V-65 (2,2'-azobis(2,4-dimethyl valeronitrile)), and V-59 (2,2'-azobis(2-methylbutyronitrile)). Organic peroxides include, but are not limited to, bis(1-oxoaryl)peroxides such as benzoyl peroxide (BPO), bis(1-oxoalkyl)peroxides such as lauroyl peroxide, and dialkyl peroxides such as dicumyl peroxide or di-tert-butyl peroxide and mixtures thereof. The temperature needed to activate the thermal initiator is often in a range of 25° C. to 160° C., 30° C. to 160° C., or 40° C. to 160° C.

Suitable redox initiators include arylsulfinate salts, triarylsulfonium salts, or N,N-dialkylaniline (e.g., N,N-dimethylaniline) in combination with a metal in an oxidized state, a peroxide, or a persulfate. Specific arylsulfinate salts include tetraalkylammonium arylsulfinates such as tetrabutylammonium 4-ethoxycarbonylbenzenesulfinate, tetrabutylammonium 4-trifluoromethylbenzenesulfinate, and tetrabutylammonium 3-trifluoromethylbenzenesulfinate. Specific triarylsulfonium salts include those with a triphenylsulfonium cation and with an anion selected from $PF_6^-$, $AsF_6^-$, and $SbF_6^-$. Suitable metal ions include, for example, ions of group III metals, transition metals, and lanthanide metals. Specific metal ions include, but are not limited to, Fe(III), Co(III), Ag(I), Ag(II), Cu(II), Ce(III), Al (III), Mo(VI), and Zn(II). Suitable peroxides include benzoyl peroxide, lauroyl peroxide, and the like. Suitable persulfates include, for example, ammonium persulfate, tetraalkylammonium persulfate (e.g., tetrabutylammonium persulfate), and the like.

In yet another aspect, a method of preparing an amino-containing polymeric material is provided. This method includes preparing a polymerizable composition that includes a monomer mixture, a free radical initiator, and an optional organic solvent. The method further includes subjecting the polymerizable composition to free radical polymerization to form a precursor polymeric material. The polymerization can proceed using any known polymerization processes such as bulk polymerization methods, solution polymerization methods, suspension polymerization methods, or emulsion polymerization methods. The precursor polymeric material is subsequently treated with an amine compound to form the amino-containing polymeric material.

With bulk polymerization methods, little or no organic solvent is included in the polymerizable composition used to form the precursor polymeric material. With solution polymerization methods, the various monomers in the monomer mixture are dissolved in a miscible organic solvent. Suitable organic solvents include, but are not limited to, ethyl acetate, amyl acetate (n-pentyl acetate), toluene, cyclohexane, cyclohexanone, and methyl ethyl ketone. Any suitable percent solids can be used in the polymerizable composition. If the percent solids are too low, however, more solvent needs to be removed from the polymerized product. Additionally, lower percent solids may adversely affect the rate of polymerization. On the other hand, if the percent solids are too high, the polymerizable composition may have an unacceptably high viscosity. The percent solids are often in a range of 0.5 to 80 weight percent, 1 to 80 weight percent, 10 to 80 weight percent, 20 to 80 weight percent, 1 to 60 weight percent, 10 to 60 weight percent, 20 to 60 weight percent, 1 to 40 weight percent, 10 to 40 weight percent, 20 to 40 weight percent, 1 to 20 weight percent, 10 to 20 weight percent, or 1 to 10 weight percent based on a total weight of the polymerizable composition.

In addition to the percent solids of the polymerizable composition, the rate of polymerization can be controlled by selection of the polymerization temperature, the initiator, and the amount of the initiator. The rate of polymerization is typically increased by increasing the temperature and/or by adding higher amounts of the initiator.

The precursor polymeric material prepared using bulk polymerization methods or solution polymerization methods is often a monolith that can be easily broken apart for washing to remove any residual monomer. The washed product can be dried to form a powder. The polymer material can also be post-cured at a high temperature. High temperature post-curing can help increase the degree of conversion of the polymerizable groups in the reaction mixture. High temperature post-curing can increase the glass transition temperature of the polymeric material, increase the resistance of the polymeric material to deformation at elevated temperatures, or both. The post-curing temperature can be greater than 100° C., greater than 130° C., or greater than 150° C. The post-curing temperature is below the decomposition temperature of the precursor polymeric material.

Alternatively, suspension polymerization methods can be used to form the crosslinked precursor polymeric material. In this type of polymerization method, an organic phase is prepared that includes the monomer mixture and the free radical initiator. Optional organic solvent that is miscible with the monomers can also be part of the organic phase. The organic phase is suspended in an aqueous phase that includes water and a suspending agent. That is, the polymerizable composition includes both an organic phase and a separate aqueous phase. The polymerizable composition is typically stirred sufficiently so that droplets of the organic phase form within the aqueous phase. As polymerization proceeds, the polymeric network grows within the suspended droplets resulting in the formation of polymeric beads.

In the suspension polymerization method, the organic phase composition usually includes the same components described above for bulk and solution polymerization methods. The same mole percent of the crosslinker monomer described above is suitable for the organic phase. The same amounts of the free radical initiator described above for use in the polymerizable composition are suitable for the organic phase.

Like the bulk polymerization methods described above, the organic phase for suspension polymerization methods often contains no organic solvent. The free radical initiator and the crosslinker are typically dissolved directly in the second monomer. If an organic solvent is present, the percent solids of the organic phase is often at least 60 weight percent, at least 70 weight percent, at least 80 weight percent, at least 90 weight percent, at least 95 weight percent, or at least 98 weight percent based on a total weight of the organic phase.

The organic phase is suspended in the aqueous phase. The volume ratio of the aqueous phase to the organic phase is typically greater than 1:1. That is, the volume of the aqueous phase exceeds the volume of the organic phase. The volume ratio of the aqueous phase:organic phase is often at least 2:1, at least 3:1, at least 4:1, or at least 5:1. Besides functioning as an inert medium for suspension of the organic phase droplets, the aqueous phase dissipates the heat generated during the polymerization reaction.

The aqueous phase for the suspension polymerization method includes a suspending agent to facilitate formation of the organic phase droplets. The suspending agent modifies the interfacial tension between the aqueous phase and the organic phase. Additionally, the suspending agent provides steric stabilization of the organic phase droplets. This steric stabilization tends to minimize or prevent the formation of agglomerated particles during the polymerization process.

The suspending agent is often a non-ionic surfactant such as cellulose polymers (e.g., methyl cellulose, carboxy methyl cellulose, carboxymethyl methyl cellulose, hydroxypropyl methyl cellulose, and hydroxybutyl methyl cellulose), gelatin, poly(vinyl alcohol), partially hydrolyzed poly (vinyl alcohol), (meth)acrylate polymers (e.g., poly (methacrylic acid), sodium poly(methacrylic acid), and ethylene maleic anhydride copolymers. Other suitable suspending agents include poly(styrene sulfonates) (e.g., sodium poly(styrene sulfonate)), talc, hydroxyapatite, barium sulfate, kaolin, magnesium carbonate, magnesium hydroxide, calcium phosphate, and aluminum hydroxide.

The amount of the suspending agent in the aqueous phase is often at least 0.05 weight percent, at least 0.1 weight percent, at least 0.2 weight percent, or at least 0.5 weight percent. The amount of suspending agent can influence the size of the polymeric beads (i.e., the use of larger amounts of suspending agent often results in the formation of smaller polymeric beads). In some embodiments, the aqueous phase contains 0.05 to 10 weight percent suspending agent. For example, the aqueous phase can contain an amount of suspending agent in a range of 0.05 to 5 weight percent, in a range of 0.1 to 10 weight percent, in a range of 0.1 to 5 weight percent, in a range of 0.1 to 3 weight percent, or in a range of 0.5 to 5 weight percent. The weight percent is based on a total weight of the aqueous phase.

The size of the polymeric bead is determined, to a large extent, by the size of the organic phase droplets. The droplet size can be affected by variables such as the rate of agitation, the temperature, the choice of suspending agent, and the amount of suspending agent. The rate of agitation, the type of suspending agent, and the amount of suspending agent can often be varied to control the aggregation or agglomeration of the resulting particles. A lack of aggregation is generally preferred. In some embodiments, the density of the aqueous phase can be selected to be approximately the same as the organic phase. Approximately matching these densities tends to result in the formation of more spherical particles as well as more uniformly sized particles.

The particles (e.g., beads) prepared using suspension polymerization methods often have an average diameter of at least 50 micrometers, at least 100 micrometers, at least 200 micrometers, at least 300 micrometers or at least 500 micrometers. For example, the average diameter is often in a range of 50 to 5000 micrometers, in a range of 100 to 3000 micrometers, in a range of 100 to 2000 micrometers, in a range of 200 to 2000 micrometers, in a range of 500 to 2000 micrometers, or in a range of 300 to 1000 micrometers.

The crosslinked precursor polymeric materials prepared using a crosslinker of Formula (I) often have a glass transition temperature that is greater than for crosslinked polymeric materials prepared using comparable amounts of divinylbenzene (i.e., same molar ratio of crosslinker to the second monomer). The glass transition temperature is often in a range of about 1° C. to about 25° C. higher depending on the amount of the crosslinker included in the monomer mixture.

Additionally, the crosslinked precursor polymeric materials prepared using a crosslinker of Formula (I) typically are more thermally stable than crosslinked polymeric materials prepared using comparable amounts of divinylbenzene (i.e., same molar ratio of crosslinker to the second monomer). The difference in the onset temperature for significant weight loss when analyzed using thermogravimetric analysis is often in a range of about 40° C. to about 50° C. higher regardless of the amount of crosslinker included in the monomer mixture.

The crosslinked precursor polymeric materials prepared using a crosslinker of Formula (I) often compresses less under a given force within certain temperature ranges (e.g., temperatures near the glass transition temperature for the polymeric material) compared to crosslinked polymeric materials prepared using comparable amounts of divinylbenzene (i.e., same molar ratio of crosslinker to the second monomer). That is, the crosslinked precursor polymeric materials prepared using a crosslinker of Formula (I) are well suited for applications where materials with higher compression resistance would be advantageous. In particular, the precursor polymeric materials are well suited for treatment with amine compounds to prepare ion exchange resins such as those used in high pressure separations. The amino-containing polymeric materials are expected to withstand the pressures typically encountered in high pressure chromatographic columns.

The precursor polymeric material has multiple groups of formula —$R^5$X where $R^5$ is an alkylene and X is a halo such as chloro or bromo. These groups result from the presence on the second monomer of Formula (II) in the monomer mixture used to form the precursor polymeric material. The precursor polymeric material is subsequently treated with an amine compound. This reaction results in the displacement of the halo group in Formula (II) and the attachment of an amino-containing group to the polymeric material.

In some embodiments, the amine compound that is reacted with the precursor polymeric material has a primary or secondary amino group. For example, the amine compound can be of formula ($R^6$)HN-Q where $R^6$ is an alkyl or hydrogen and Q is the residue of the amine compound (i.e., the remainder of the amine compound that is not the amino group ($R^6$)HN—). The resulting amino-containing polymeric material has multiple groups of formula —$R^5$—N($R^6$)-Q. These amine compounds can have a single or multiple amino groups. That is, the group Q can include an additional amino groups ($R^6$)HN—. Suitable amine compounds include, but are not limited to, those having a single amino group such as methylamine, ethylamine, proplyamine, and the like. Suitable polyamines include, for example, ethylene diamine, diethylenetriamine, triethylenetetramine, tetraethylenepentamine, and the like.

In other embodiments, the amine compound that is reacted with the precursor polymeric material is a tertiary amino group. For example, the amine compound can be of formula N($R^7$)$_3$ where each $R^7$ group is an alkyl group. Suitable alkyl groups for $R^7$ often have 1 to 10 carbon atoms, 1 to 6 carbon atoms, 1 to 4 carbon atoms, or 1 to 2 carbon atoms. For example, the amine compound can be trimethylamine, triethylamine, or tributylamine.

The reaction between the precursor and the amine compound can be conducted at any temperature in the range of room temperature to about 150° C. In some embodiments, the reaction is in a range of 50° C. to 125° C. or in a range of 75° C. to 100° C. The reaction time can be in a range of several hours to multiple days. Typically, an excess of the amine compound is added based on the moles of available —$R^5$X groups on the precursor polymeric material. The excess can be in the range of 1.1 to 10 based on the moles of —$R^5$X groups (moles of amine compound to moles of —$R^5$X groups are in the range of 1.1 to 10 based on the moles of —$R^5$X groups).

The amino-containing polymeric material typically contains at least 0.2 milliequivalents of amino group per gram. In some embodiments, the amount of amino group is in a range of 0.2 to 15 milliequivalents per gram, in a range of 0.2 to 10 milliequivalents per gram, in a range of 0.2 to 5 milliequivalents per gram, in a range of 0.5 to 5 milliequivalents per gram, in a range of 1 to 5 milliequivalents per gram, in arrange of 1 to 4 milliequivalents per gram, in a range of 2 to 5 milliequivalents per gram, or in a range of 3 to 4 milliquivalents per gram of the amino-containing polymeric material. This number tends to increase as the amount of monomer of Formula (II) in the polymerizable composition increases. Any suitable method can be used to determine the milliequivalents per gram. In one preferred method, the total nitrogen content of the amino-containing polymeric material is determined by elemental analysis.

The amino-containing polymeric material can be used as an ion exchange resin for the separation or concentration of negatively charged materials or ions. That is, the amino-containing polymeric material functions as an anion exchange resin. Negatively charged materials tend to be retained longer by the amino-containing polymeric material than neutral materials or positively charged materials or ions. Further, negatively charged materials or ions with a greater negative charge (e.g., phosphate ions) tend to be retained longer by the amino-containing polymeric material than negatively charged materials or ions with lower negative charge (e.g., nitrate ions). In some embodiments, the pH conditions during separation are selected so that the amino-containing polymeric material is positively charged.

The ion exchange resins can be placed within a chromatographic column. Alternatively, the ion exchange resin can be distributed on the surface of a porous substrate, distributed throughout a porous substrate, or both. The porous substrate can be, for example, a filtration medium or any other porous matrix.

Various embodiments are provided of amino-containing polymeric materials and methods of making the amino-containing polymeric materials.

Embodiment 1 is an amino-containing polymeric material that includes a reaction product of a reaction mixture containing a) a precursor polymeric material and b) an amine compound. The precursor material includes the polymerized product of a polymerizable composition containing i) a monomer mixture and ii) a free radical initiator. The monomer mixture contains 1) a first monomer of Formula (I)

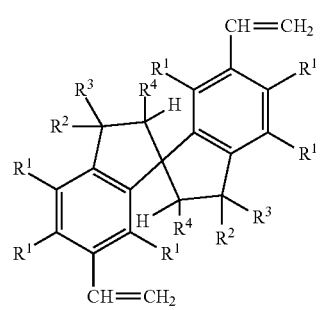

and 2) a second monomer of Formula (II).

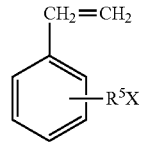

In the monomer of Formula (I), each $R^1$ is hydrogen, halo, alkyl, aryl, alkaryl, or aralkyl, wherein at least one $R^1$ is hydrogen. Each $R^2$ is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings. Each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon bond. Each $R^4$ is independently hydrogen or combines with $R^3$ connected to the adjacent carbon atom to form a carbon-carbon bond. In the monomer of Formula (II), the group $R^5$ is an alkylene and the group X is halo.

Embodiment 2 is the amino-containing polymeric material of embodiment 1, wherein each $R^1$ of the first monomer is hydrogen or halo.

Embodiment 3 is the amino-containing polymeric material of embodiment 1 or 2, wherein each $R^2$ and each $R^3$ of the first monomer are alkyl.

Embodiment 4 is the amino-containing polymeric material of any one of embodiments 1 to 3, wherein $R^4$ of the first monomer is hydrogen.

Embodiment 5 is the amino-containing polymeric material of any one of embodiments 1 to 4, wherein the first monomer is 3,3,3',3'-tetramethyl-1,1'-spirobisindan-6,6'-divinyl.

Embodiment 6 is the amino-containing polymeric material of any one of embodiments 1 to 5, wherein the monomer mixture comprises 1 to 25 mole percent of the first monomer of Formula (I).

Embodiment 7 is the amino-containing polymeric material of any one of embodiments 1 to 6, wherein the monomer mixture further comprises a polyvinyl aromatic monomer that is not of Formula (I).

Embodiment 8 is the amino-containing polymeric material of any one of embodiments 1 to 7, wherein the amino-containing polymer is in a form of particles or beads.

Embodiment 9 is the amino-containing polymeric material of any one of embodiments 1 to 8, wherein the amine compound has at least one primary amino group or secondary amino group.

Embodiment 10 is the amino-containing polymeric material of any one of embodiments 1 to 8, wherein the amine compound is a trialkylamine.

Embodiment 11 is the amino-containing polymeric material of any one of embodiments 1 to 10, wherein the amino-containing polymeric material is an anion exchange resin.

Embodiment 12 is a method of making an amino-containing polymeric material. The method includes preparing a polymerizable composition containing a) a monomer mixture and b) a free radical initiator. The monomer mixture contains i) a first monomer of Formula (I) and ii) a second monomer of Formula (II). The first monomer of Formula (I) and the second monomer of Formula (II) are the same as described above. The method further includes forming a precursor polymeric material by reacting the polymerizable composition and then treating the precursor polymeric material with an amine compound to form the amino-containing polymeric material.

Embodiment 13 is the method of embodiment 12, wherein the polymerizable composition comprises (1) an organic phase comprising the monomer mixture and the free radical initiator and (2) an aqueous phase comprising water and a suspending agent, wherein the organic phase is suspended as droplets within the aqueous phase and wherein the amino-containing polymeric material is in a form of particles or beads.

Embodiment 14 is the method of embodiments 12 or 13, wherein each $R^1$ of the first monomer is hydrogen or halo.

Embodiment 15 is the method of any one of embodiments 12 to 14, wherein each $R^2$ and each $R^3$ of the first monomer are alkyl.

Embodiment 16 is the method of any one of embodiments 12 to 15, wherein $R^4$ of the first monomer is hydrogen.

Embodiment 17 is the method of any one of embodiments 12 to 16, wherein the first monomer is 3,3,3',3'-tetramethyl-1,1'-spirobisindan-6,6'-divinyl.

Embodiment 18 is the method of any one of embodiments 12 to 17, wherein the monomer mixture comprises 1 to 25 mole percent of the first monomer of Formula (I).

Embodiment 19 is the method of any one of embodiments 12 to 18, wherein the amine compound has at least one primary amino group or secondary amino group.

Embodiment 20 is the method of any one of embodiments 12 to 19, wherein the amine compound is a trialkylamine.

Embodiment 21 is the method of any one of embodiments 12 to 20, wherein the monomer mixture further comprises a polyvinyl aromatic monomer that is not of Formula (I).

Embodiment 22 is the method of any one of embodiments 12 to 21, wherein the amino-containing polymeric material is an anion exchange resin.

Embodiment 23 is an anion exchange resin comprising the amino-containing polymeric material of embodiment 1.

Embodiment 24 is the anion exchange resin of embodiment 23, wherein the anion exchange resin is in a form of beads or particles Embodiment 25 is an article comprising a chromatographic column and the anion exchange resin of embodiment 23 or 24 positioned within the chromatographic column.

Embodiment 26 is an article comprising a porous substrate and the anion exchange resin of embodiment 23 or 24 positioned on a surface of the porous substrate, distributed throughout the porous substrate, or a combination thereof.

EXAMPLES

TABLE 1

Glossary of materials

| Chemical Name | Chemical Supplier |
| --- | --- |
| 4,4'-Isopropylidene diphenol | Alfa Aesar, Ward Hill, MA |
| Methane sulfonic acid | Alfa Aesar, Ward Hill, MA |
| Methylene Chloride | EMD Millipore Chemicals, Billerica, MA |
| Methanol | BDH Merck Ltd., Poole Dorset, UK |
| Pyridine | EM Science, Gibbstown, NJ |
| Trifluoromethane sulfonic acid | Oakwood Products, West Columbia, SC |
| Concentrated hydrogen chloride | EMD Millipore Chemicals, Billerica, MA |
| Sodium bicarbonate | J. T. Baker, Phillipsburg, NJ |
| Sodium sulfate | BDH Merck Ltd., Poole Dorset, UK |
| N,N-Dimethyl formamide | Sigma-Aldrich, Milwaukee, WI |
| Tributyl(vinyl)tin | Sigma-Aldrich, Milwaukee, WI |
| Lithium chloride | Mallinckrodt, St. Louis, MO |
| Bis(triphenylphosphine)palladium (II) chloride | Sigma-Aldrich, Milwaukee, WI |
| Diethyl ether | EMD Millipore Chemicals, Billerica, MA |
| Potassium fluoride | J. T. Baker, Phillipsburg, NJ |
| Ethyl acetate | EMD Millipore Chemicals, Billerica, MA |
| Petroleum ether | EMD Millipore Chemicals, Billerica, MA |
| Benzoyl peroxide | Sigma-Aldrich, Milwaukee, WI |
| Acetone-D6 | Cambridge Isotope Laboratories, Inc., Andover, MA |
| Chloroform-D | Cambridge Isotope Laboratories, Inc., Andover, MA |
| 4-Vinylbenzyl chloride | Sigma-Aldrich, Milwaukee, WI |
| m-Xylene | Sigma-Aldrich, Milwaukee, WI |
| Trimethylamine (33 percent by weight solution in ethanol) | Alfa Aesar, Ward Hill, MA |
| Phenolphthalein | Sigma-Aldrich, Milwaukee, WI |
| Sodium hydroxide | EMD Millipore Chemicals, Billerica, MA |

Synthesis of 3,3,3',3'-tetramethyl-1,1'-spirobisindan-6,6'-diol (SBI-diol)

In a 5.0 L round bottomed flask, 1000.69 grams (4.38 moles) of 4,4'-isopropylidene diphenol (BPA) was melted. Once all of the BPA was melted, 50.51 grams (0.526 moles) of methane sulfonic acid was slowly added. The reaction mixture was stirred for 3 hours under a nitrogen atmosphere maintaining the temperature of the reaction mixture between 135-150° C. After 3 hours, while still hot, the molten reaction mixture was poured into 2.0 L of deionized water. A brown precipitate formed. The resulting precipitate was isolated by vacuum filtration and washed with 1.5 L of deionized water. The isolated solid was then put back in the 5.0 L round bottomed flask and 1.5 L of methylene chloride ($CH_2Cl_2$) was added. The solid was stirred in the $CH_2Cl_2$ at reflux for one hour. The flask was then allowed to cool to room temperature, and the flask was placed in a refrigerator (about 0° C.) overnight. The solid was then isolated by vacuum filtration and washed with a minimal amount (about 500 mL) of chilled $CH_2Cl_2$. The solid was then placed in a 4.0 L Erlenmeyer flask and dissolved in 900 mL of methanol (MeOH). To this solution was added 190 mL of $CH_2Cl_2$. The solution remained clear. The solution was stirred and 1.1 L of deionized water was added in portions. A white precipitate formed, and the mixture was placed in a refrigerator (about 0° C.) overnight. The solid was isolated by vacuum filtration and washed with a minimal amount (about 300 mL) of chilled $CH_2Cl_2$. The MeOH/$CH_2Cl_2$/$H_2O$ precipitation was repeated once more. The solid from the second precipitation was dried in a vacuum oven at 85° C. overnight to yield 214.77 grams (48 percent yield) of SBI-diol. $^1$H NMR (500 MHz, acetone-$d_6$) δ 7.85 (s, 2H), 7.02 (d, J=8.1 Hz, 2H), 6.68 (dd, J=8.1, 2.4 Hz, 2H), 6.19 (d, J=2.4 Hz, 2H), 2.32 (d, J=13.0 Hz, 2H), 2.19 (d, J=13.0 Hz, 2H), 1.35 (s, 6H), 1.29 (s, 6H).

Synthesis of perfluoromethane-1-sulfonic acid 6'-(perfluoromethane-1-sulfonyloxy)-3,3,3',3'-tetramethyl-1,1'-spirobisindane-6-yl ester (SBI-bistriflate)

In a 250 mL round bottomed flask, 5.0025 grams (16.2 mmoles) of SBI-diol and 4.755 mL (47.1 mmoles) of pyridine were dissolved in 150 mL of $CH_2Cl_2$. The flask was placed in an ice/water bath. To this solution was added dropwise 7.930 mL (58.8 mmoles) of trifluoromethane sulfonic anhydride (TFMSA). After the addition was complete, the flask was removed from the ice/water bath. The reaction mixture was stirred at room temperature under a nitrogen atmosphere for 1 hour. The reaction was stopped by adding 10 mL of aqueous hydrogen chloride (HCl) (10 percent by weight). The resulting mixture was partitioned between $CH_2Cl_2$ and a saturated aqueous solution of sodium bicarbonate ($NaHCO_3$). The organic layer was isolated, dried over anhydrous sodium sulfate ($Na_2SO_4$) and filtered. The filtrate was condensed under reduced pressure and dried under high vacuum at room temperature for 3 hours to remove any residual pyridine. The resulting tan solid (SBI-bistriflate) weighed 8.51 grams (92 percent yield). $^1$H NMR (500 MHz, $CDCl_3$) δ 7.17 (d, J=8.3 Hz, 2H), 7.08 (dd, J=8.3, 2.3 Hz, 2H), 6.55 (d, J=2.3 Hz, 2H), 2.26 (ABq, J=13.2 Hz, 4H), 1.34 (s, 6H), 1.29 (s, 6H). $^{19}$F NMR (470.5 MHz, $CDCl_3$) δ −73.0.

Synthesis of 3,3,3',3'-tetramethyl-1,1'-spirobisindan-6,6'-divinyl (SBI-DV)

In a 250 mL round bottomed flask, 5.0025 grams (8.74 mmoles) of SBI-bistriflate) was dissolved in 75 mL of anhydrous N,N-dimethyl formamide (DMF). To this solution was added 6.125 mL (21.0 mmoles) of vinyl tributyltin and 22.2225 grams (52.4 mmoles) of lithium chloride (LiCl). The reaction mixture was stirred at room temperature under a nitrogen atmosphere for 5 minutes before adding 0.6140 grams (875 μmoles (micromoles)) of bis(triphenylphosphine)palladium (II) chloride. The reaction mixture was stirred at room temperature overnight under a nitrogen atmosphere. After reacting for 24 hours at room temperature, the reaction was stopped by pouring the reaction mixture into 150 mL of deionized water. A precipitate formed. The aqueous layer and precipitate were extracted with diethyl ether ($Et_2O$) (3×200 mL). The organic layers were combined. The organic layer was then stirred vigorously at room temperature with an equal volume of aqueous potassium fluoride (KF) (10 grams/100 mL) for 1 hour. A gray-white precipitate formed and the mixture was vacuum filtered. The filtrate was then placed back in a separatory funnel and the organic layer isolated. The organic layer was then dried over anhydrous $Na_2SO_4$, filtered and the filtrate was condensed under reduced pressure to yield a white solid. This solid was further purified by silica gel chromatography. The material was loaded onto a silica gel column (8×25 cm), and the column was eluted with 5 percent ethyl acetate (EtOAc)/95 percent petroleum ether (PE) (vol./vol.). Fractions containing the pure SBI-DV were combined, condensed under reduced pressure and dried under high vacuum at room temperature to yield 2.3822 grams (83 percent yield) of SBI-DV as a white solid. $^1$H NMR (500 MHz, $CDCl_3$) δ 7.34 (dd, J=7.9, 1.6 Hz, 2H), 7.17 (d, J=7.9 Hz, 2H), 6.85 (d, J=1.6 Hz, 2H), 6.64 (dd, J=17.6, 10.9 Hz, 2H), 5.62 (dd, J=17.6, 1.0 Hz, 2H), 5.12 (dd, J=10.9, 1.0 Hz, 2H), 2.32 (ABq, J=13.1 Hz, 4H), 1.42 (s, 6H), 1.36 (s, 6H).

Example 1

In an 8 mL vial, 1.235 grams (8.09 mmoles) of 4-vinylbenzyl chloride and 0.200 grams (607 moles) of SBI-DV were dissolved in 0.478 grams of m-xylene. To this solution was added 39.1 milligrams (161 μmoles) of BPO. The polymerization mixture thus consisted of a m-xylene solution of a 13.3:1 molar ratio of 4-vinylbenzyl chloride:SBI-DV at 75 percent solids and 2.7 weight percent BPO. The polymerization mixture was bubbled with nitrogen for 10 minutes. The vial was then capped and placed in a sand bath at 90° C. The polymerization was heated at this elevated temperature for 18 hours. A solid had formed and was isolated by vacuum filtration and washed with EtOAc. The solid was placed in a 20 mL vial and 15 mL of EtOAc was added to the vial. The material was left sitting in the EtOAc for 1 hour. The solid was again isolated by vacuum filtration and washed with EtOAc. The solid was placed in a 20 mL vial and 15 mL of EtOAc was added to the vial. The material was left sitting in the EtOAc for 5 days. The solid was again isolated by vacuum filtration and washed with EtOAc. The solid was then dried under high vacuum at 100° C. overnight.

The resulting SBI-DV crosslinked poly(4-vinylbenzyl chloride) was reacted with trimethylamine to produce quaternized amine groups. The functionalization was accomplished by placing 0.506 grams of the SBI-DV crosslinked poly(4-vinylbenzyl chloride) in a 20 mL vial containing 15 mL of 33 percent by weight trimethylamine in ethanol. The vial was capped and placed in a sand bath at 85° C. The reaction mixture was heated at this elevated temperature for 5 days. The reaction mixture was poured into a 120 mL jar containing 60 mL of 0.1 M aqueous HCl. The material was left sitting in the aqueous acidic solution for 1 hour. The solid was isolated by vacuum filtration. The solid was placed back in a 120 mL jar containing 60 mL of water. The pH of the solution was checked and found to be about 9. Aqueous 1 M HCl was added dropwise until the pH of the solution was 4. The solid was left sitting in this aqueous acidic solution overnight. The solid was again isolated by vacuum filtration. The solid was then dried under high vacuum at 100° C. overnight.

The ion exchange capacity (anion exchange capacity) of the quaternized amine functional SBI-DV crosslinked poly(4-vinylbenzyl chloride) was determined by liquid titration to be 3.34 mmoles/gram. This material was also analyzed by elemental analysis which based on the percent by weight nitrogen content showed this material to have an anionic exchange capacity of 3.74 mmoles/gram.

Procedure for Determination of Anionic Exchange Capacity by Liquid Titration:

The quaternized amine functional SBI-DV crosslinked poly(4-vinylbenzyl chloride) (about 0.200 grams) was suspended in 10 mL of 0.1 M aqueous NaOH. The material was left sitting in this basic aqueous solution for 1 hour. The suspension was vacuum filtered. To the aqueous filtrate was added 1 drop of a 1 percent by weight aqueous solution of phenolphthalein. This solution was then titrated with 0.1 M aqueous HCl until the pink color disappeared (phenolphthalein endpoint). The anionic exchange capacity was calculated based on the difference between the amount of NaOH in the original 10 mL of solution and the amount isolated after exposure to the ion exchange material as determined by titration.

Elemental Analysis:

Samples were analyzed for weight percent carbon, hydrogen, and nitrogen by combustion using a LECO TruSpec Micro CHNS elemental analyzer (LECO Corp, St. Joseph, Mich.). The samples were run in triplicate or better. Results are reported as the averages of replicate determinations. In order to eliminate ambient water from the analysis, aliquots of each sample were dried on a steam-plate under nitrogen for 2 hours and allowed to cool in a nitrogen purged dry-box for 30 minutes before weighing. The samples were placed in silver capsules and crimped and placed on the auto-sampler in ambient conditions.

The LECO TruSpec Micro CHNS instrument was calibrated by first base-lining the instrument with ambient air until the CHNS detectors are stabilized. Next, 3-4 empty crucibles were measured and set as instrument blanks. Finally, a calibration curve was generated with sulfamethazine as a standard. Based on this procedure the standard deviation for each element was: less than +/−0.5 wt. % for carbon, less than +/−0.3 wt. % for hydrogen, less than +/−0.3 wt. % for nitrogen, and less than +/−0.3 wt. % for sulfur.

I claim:

1. An amino-containing polymeric material comprising a reaction product of a reaction mixture comprising:
   a) a precursor polymeric material comprising a polymerized product of a polymerizable composition comprising
      i) a monomer mixture comprising
         1) a monomer of Formula (I)

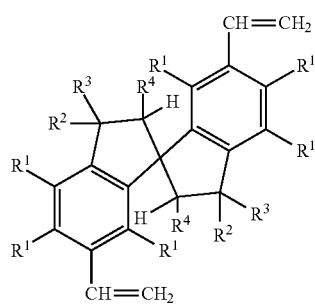

wherein
  each $R^1$ is hydrogen, halo, alkyl, aryl, alkaryl, or aralkyl, wherein at least one $R^1$ is hydrogen;
  each $R^2$ is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings;
  each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon bond; and
  each $R^4$ is independently hydrogen or combines with $R^3$ connected to the adjacent carbon atom to form a carbon-carbon bond; and
2) a second monomer of Formula (II)

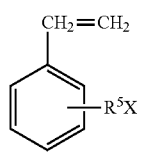

wherein
  $R^5$ is an alkylene; and
  X is a halo; and
ii) a free radical initiator; and
b) an amine compound.

2. The amino-containing polymeric material of claim 1, wherein each $R^1$ of the first monomer is hydrogen or halo.

3. The amino-containing polymeric material of claim 1, wherein each $R^2$ and each $R^3$ of the first monomer are alkyl.

4. The amino-containing polymeric material of claim 1, wherein $R^4$ of the first monomer is hydrogen.

5. The amino-containing polymeric material of claim 1, wherein the first monomer is 3,3,3',3'-tetramethyl-1,1'-spirobisindan-6,6'-divinyl.

6. The amino-containing polymeric material of claim 1, wherein the monomer mixture comprises 1 to 25 mole percent of the first monomer of Formula (I).

7. The amino-containing polymeric material of claim 1, wherein the monomer mixture further comprises a polyvinyl aromatic monomer that is not of Formula (I).

8. The amino-containing polymeric material of claim 1, wherein the amino-containing polymer is in a form of particles or beads.

9. The amino-containing polymeric material of claim 1, wherein the amine compound has at least one primary amino group or secondary amino group.

10. The amino-containing polymeric material of claim 1, wherein the amine compound is a trialkylamine.

11. The amino-containing polymeric material of claim 1, wherein the amino-containing polymeric material is an anion exchange resin.

12. A method of preparing an amino-containing polymeric material, the method comprising:
  preparing a polymerizable composition comprising
    i) a monomer mixture comprising
      1) a first monomer of Formula (I)

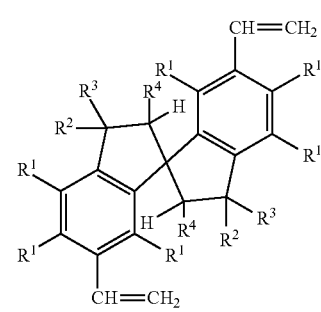

wherein
  each $R^1$ is hydrogen, halo, alkyl, aryl, alkaryl, or aralkyl, wherein at least one $R^1$ is hydrogen;
  each $R^2$ is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings;
  each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon bond; and
  each $R^4$ is independently hydrogen or combines with $R^3$ connected to the adjacent carbon atom to form a carbon-carbon bond;
2) a second monomer of Formula (II)

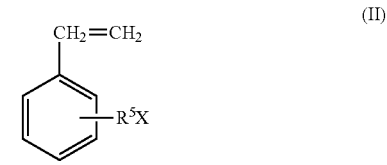

wherein
  $R^5$ is an alkylene; and
  X is a halo; and
ii) a free radical initiator; and forming a precursor polymeric material by reacting the polymerizable composition; and treating the precursor polymeric material with an amine compound to form the amino-containing polymeric material.

13. The method of claim 12, wherein the polymerizable composition comprises (1) an organic phase comprising the monomer mixture and the free radical initiator and (2) an aqueous phase comprising water and a suspending agent, wherein the organic phase is suspended as droplets within the aqueous phase and wherein the amino-containing polymeric material is in a form of particles or beads.

* * * * *

UNITED STATES PATENT AND TRADEMARK OFFICE
CERTIFICATE OF CORRECTION

| | | |
|---|---|---|
| PATENT NO. | : 9,463,454 B2 | Page 1 of 2 |
| APPLICATION NO. | : 14/889666 | |
| DATED | : October 11, 2016 | |
| INVENTOR(S) | : Michael Wendland | |

It is certified that error appears in the above-identified patent and that said Letters Patent is hereby corrected as shown below:

In the Specification

Column 4

Line 26, delete "spriobisindane" and insert -- spirobisindane --, therefor.

Column 6

Lines 31-32 (approx.), delete "spirobisindan" and insert -- spirobisindane --, therefor.

Column 7

Line 15 (approx.), delete "spirobisindan" and insert -- spirobisindane --, therefor.

Line 16 (approx.), delete "spirobisindan" and insert -- spirobisindane --, therefor.

Line 19 (approx.), delete "spirobisindan" and insert -- spirobisindane --, therefor.

Line 20 (approx.), delete "spirobisindan" and insert -- spirobisindane --, therefor.

Line 30, delete "spirobisindan" and insert -- spirobisindane --, therefor.

Column 9

Line 42, delete "is is" and insert -- is --, therefor.

Column 12

Line 52, delete "methylproprionate))," and insert -- methylpropionate)), --, therefor.

Signed and Sealed this
Sixth Day of June, 2017

Michelle K. Lee
*Director of the United States Patent and Trademark Office*

Column 16

Line 26, delete "proplyamine," and insert -- propylamine, --, therefor.

Line 56, delete "arrange" and insert -- a range --, therefor.

Line 58, delete "milliquivalents" and insert -- milliequivalents --, therefor.

Column 18

Line 16 (approx.), delete "spirobisindan" and insert -- spirobisindane --, therefor.

Column 19

Line 3, delete "spirobisindan" and insert -- spirobisindane --, therefor.

Line 23 (approx.), after "particles" insert -- . --.

Column 20

Line 1, delete "spirobisindan" and insert -- spirobisindane --, therefor.

Line 63 (approx.), delete "spirobisindan" and insert -- spirobisindane --, therefor.

Column 21

Line 38, delete "moles)" and insert -- μmoles) --, therefor.

In the Claims

Column 23

Lines 60-61 (approx.), in Claim 5, delete "spirobisindan" and insert -- spirobisindane --, therefor.